Figure 1:
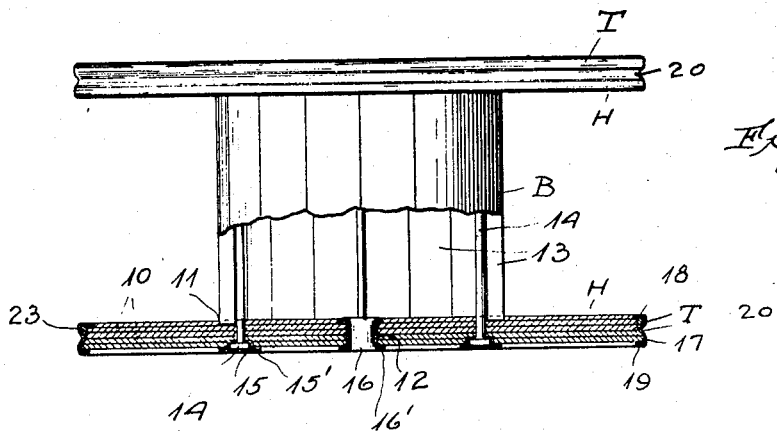

April 8, 1930.  E. J. HUBBARD  1,753,342

REEL

Filed Feb. 25, 1928

Inventor,
Eber J. Hubbard
By Charles J. Schmidt
Atty.

Patented Apr. 8, 1930

1,753,342

UNITED STATES PATENT OFFICE

EBER J. HUBBARD, OF BERWYN, ILLINOIS

REEL

Application filed February 25, 1928. Serial No. 256,853.

This invention relates to spools or reels and particularly to such structures in which the end disks or heads are of non-metallic material or of laminations such as wood. The object is to provide improved ways and means for strengthening and reinforcing the heads and for protecting them against wear and injury, particularly at their peripheries.

Figure 2:
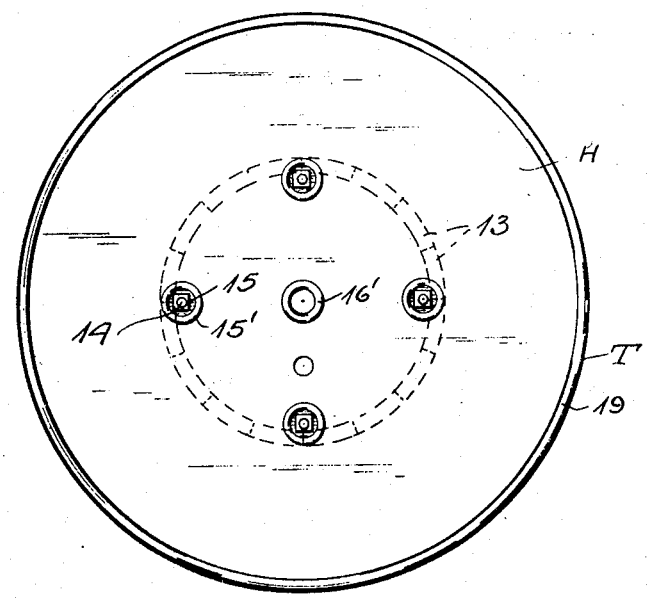
Figure 3:
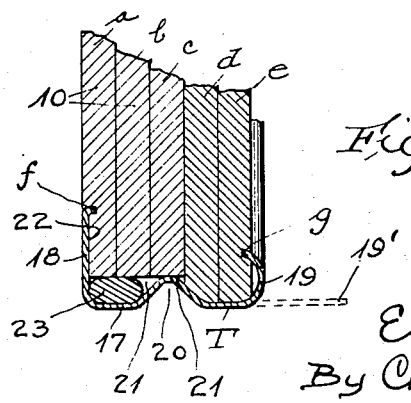

Referring to the drawing;

Fig. 1 is a side elevation, partly in diametral section, of a reel to which the invention is applied, Fig. 2 is an end view, and Fig. 3 is an enlarged diametral sectional view showing the reinforcement.

The reel shown comprises the hub or barrel B and the end disks or heads H. Each head is built up of a number of laminations 10 and on its inner side has an annular groove 11 concentric therewith and at its center has a spindle receiving opening 12.

The barrel is built up of wooden staves 13 which at their ends engage in the annular grooves 11 of the heads. Bolts 14 passing through the heads and the barrel securely hold the heads to the barrel. To bring the ends of the bolts within or flush with the outer faces of the heads, countersunk or cup washers 15 are provided to receive the bolt heads and nuts. To securely anchor the washers, their peripheral sections 15' are deflected laterally to engage against the outer faces of the heads. The spindle openings 12 have bushings 16 whose ends 16' are deflected laterally with their edges sunk a distance into the heads.

The heads of spools or reels are exposed to considerable wear and tear, this being particularly true of larger reels which support heavy material such as wire and which are moved usually by rolling on the heads. The heads are also provided with belt grooves so that the reels may be readily turned for winding or unwinding.

The structure shown is a reel for supporting comparatively heavy material and in order to make the heads tough and durable they are plied or laminated. As shown each head is composed of five plies or laminations $a, b, c, d$ and $e$, and to strengthen and protect the heads at their peripheries, I provide sheet metal binders or tire structures T, each comprising a cylindrical tread section 17 with inner and outer radially extending flanges 18 and 19, and the belt groove 20. The tire structures may be formed from sheet metal bands or strips by means of dies or rollers. The inner flange 18 and the belt groove are first formed, the section 19' primarily remaining straight as indicated by dotted lines on Fig. 3. In order that the structure thus formed may be applied to a head, the inner laminations $a, b$ and $c$ are of less diameter than the outer laminations $d$ and $e$ to leave the clearance space 21 for the annular indentation 20' for providing the belt groove 20. The head with the embryo tire structure applied thereto is then put into dies and under powerful pressure the sections 19' are turned in to form the flange 19, the flanges being forced intimately against the inner and outer faces of the head and their edges $f$ and $g$ are deflected and sunk into the head material. The inner face of the head may have been previously cut away to form a groove 22 for receiving the inner flat flange, or the die pressure may be sufficiently great to compress the head material enough to bring the outer face of the flange flush with the inner sides of the heads uniplanar and free from any projections on which wire or other material might catch when the reel is wound or unwound.

To strengthen the outer flange and to form a seat for the reel when it is set on end, the flange is transversely curved or beaded as shown. Such bead projects beyond the head outer face a distance equal to or slightly greater than the projecting distance of the washer and bushing flanges or ends 15' and 16'. The reel can then firmly rest on its ends.

In order to fill in the otherwise empty spaces 21 and to strengthen and reinforce the inner corners of the tire structures, metal filler rings 23 are inserted in the embryo tire structure before they are applied to the heads and the rings are then firmly held in place when the tire structures are finally secured to the heads as before explained.

At the central part of the heads their laminations are securely held together by the bolts and bushings, while along their outer sections or peripheries the tire structures securely clamp and hold the laminations together and strengthen and reinforce the heads and protect them against wear and breakage when the reels are rolled or thrown about during transportation or usage.

Having described my invention, I claim as follows:—

1. A spool or reel comprising a barrel and non-metallic heads secured thereto, and a sheet metal reinforcing tire structure for each head in the form of a narrow cylindrical band having inner and outer flanges extending radially to clamp against the inner and outer faces of the head adjacent to the head periphery, there being grooves in the head adjacent to its periphery to receive the flange ends whereby to secure the tire structure against radial displacement.

2. A spool or reel comprising a barrel and non-metallic heads secured thereto, and a sheet metal reinforcing tire structure for each head in the form of a narrow cylindrical band having inner and outer flanges extending radially to clamp against the inner and outer faces of the head adjacent to the head periphery, the inner flange being flat and the outer flange being outwardly of convex cross section, there being grooves in the head adjacent to its periphery to receive the flange ends whereby to secure the tire structure against radial displacement.

In witness whereof, I hereunto subscribe my name this 20th day of February, 1928.

EBER J. HUBBARD.